Sept. 1, 1931. F. LAWACZECK 1,821,265
OPERATION OF POWER PLANTS
Original Filed March 16, 1927
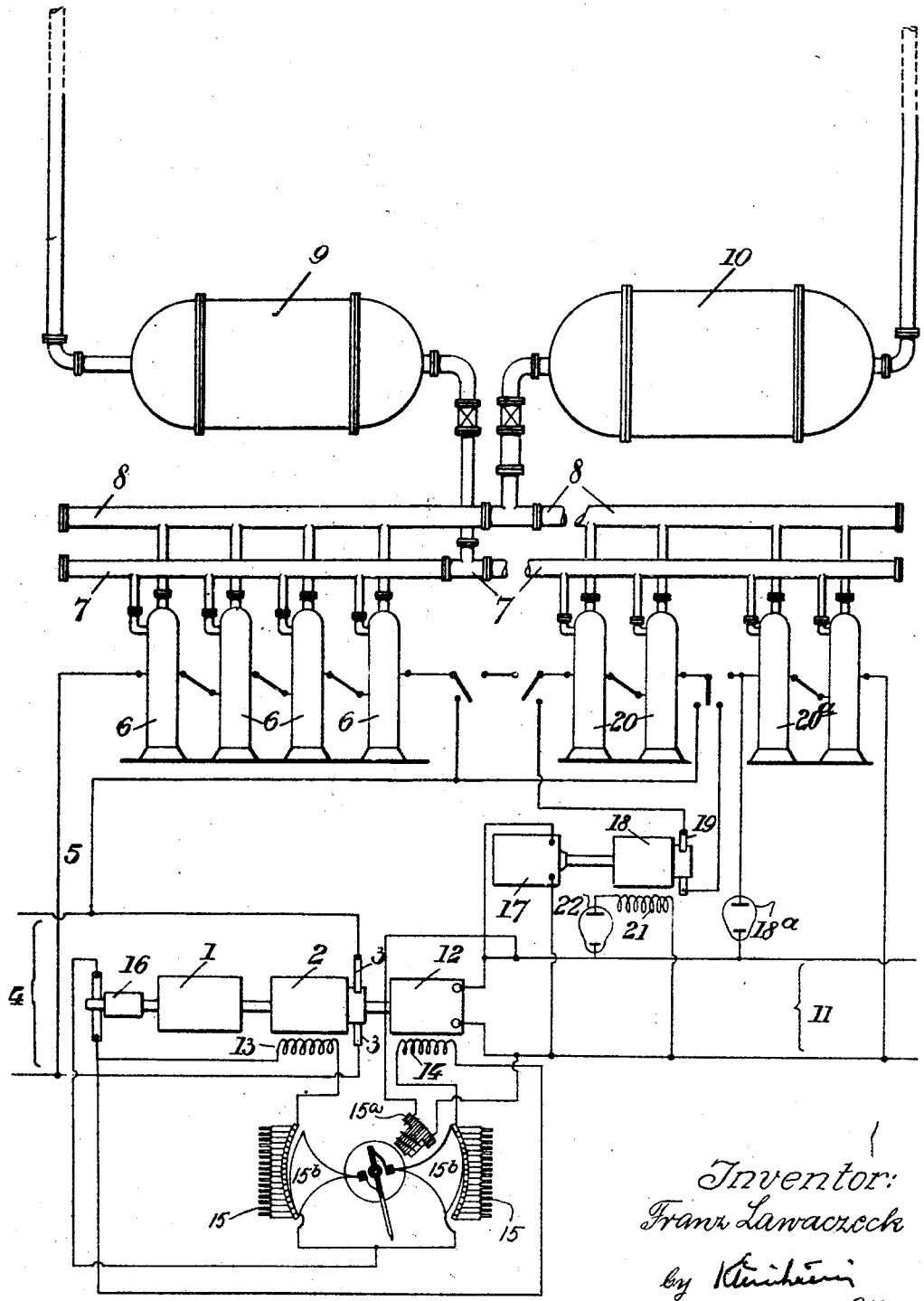
Inventor:
Franz Lawaczeck
by Kinkium
atty.

Patented Sept. 1, 1931

1,821,265

UNITED STATES PATENT OFFICE

FRANZ LAWACZECK, OF MUNICH, GERMANY, ASSIGNOR TO FIRM: LAWACZECK GESELLSCHAFT MIT BESCHRANKTER HAFTUNG, OF BERLIN, GERMANY

OPERATION OF POWER PLANTS

Original application filed March 16, 1927, Serial No. 175,855, and in Germany December 28, 1922. Divided and this application filed December 8, 1927. Serial No. 238,687.

My invention relates to the utilization of energy available in power plants in excess of the regular energy consumed.

It is a well known fact that in power plants serving for the production of electric energy, more especially in plants operated with wind power or hydraulic power, in which a varying quantity of energy and, in most cases a greater quantity than normally required, is available, complicated regulating means and manipulations are required for operation of the plant, while at the same time keeping constant the voltage in the system supplied from the plant.

My invention enables the excess energy to be utilized. This is effected according to my invention by connecting an electrolytic battery in parallel to the system. The electrolytic battery is preferably one operating at a high pressure. Due to the high pressure under which the gas is generated the battery constitutes a comparatively small part of the plant while a battery operated under normal pressure and connected in parallel to the system would be impracticable, as it would be far too large and would require too much attendance.

As long as the minimum number of revolutions per minute of the engine is able to supply the voltage required for disassociating the water—a condition which will always be fulfilled with the low voltage required for the battery—the advantage is obtained that a speed governor is not required for the power plant, or which at least can be very much simplified, which is particularly important for hydraulic plants, as in such plants the governor is very expensive, because the battery connected in parallel to the system constitutes the simplest voltage limiting means and prevents the voltage exceeding an amount which is equal to the disassociation voltage plus the resistance loss in the line intermediate the terminals of the generator and the battery for any number of revolutions in the engine which operates the generator. For it is a property of the battery that its voltage will increase only very little beyond a given current density. A battery is thus able to operate with the fourfold of its normal current without an increase of the voltage by more than a few, say five per cent. Consequently the voltage of the system with the battery connected in parallel cannot exceed the percentage even when the difference between the power generated in the plant and that consumed by the system is very considerable, say 200 per cent. Preferably a generator is provided in which the voltage decreases with increasing current, while the number of revolutions per minute remains uniform.

In the diagrammatic single figure affixed to this specification and forming part thereof a plant in which my invention can be performed is illustrated diagrammatically, it being understood that the plant shown is only an example for the many possibilities of reducing my invention to practice.

Referring now to the drawing, 1 is an engine of any suitable type, for instance a hydraulic or steam turbine which operates a direct-current generator 2. 3, 3 are the terminals or bus of the generator to which the direct-current system 4 is connected. The current not required in the system is conducted to an electrolytic high pressure battery 6 by means of wires 5 connected in parallel to the system 4. The electrodes of the several electrolyzer units may be connected in series for facilitating their connection to normal system voltage, for instance by the means described in my U. S. Patent No. 1,600,478, and the several units 6 may also be connected in series. 7 and 8 are headers for the gases generated in the units 6 from which they are separately connected under pressure, and 9 and 10 are storage reservoirs connected to the headers for oxygen and hydrogen, respectively.

On account of its easy transformation, it is customary to supply alternating current to the long distance network 11. In the event that all elements, including the decomposing battery 6, are erected at a central station, the prime mover 1 of the central station is, of course, coupled directly with a direct current dynamo 2 as well as with an alternating current generator 12 in any suitable manner, such for example as journalling them on the same shaft. The exciting machine 16 for both electric machines may then be suitably placed on the same shaft. If the prime mover 1 is under uniform load and adapted to run under full load and to distribute its power according to the needs of the alternating current network 11 and to the pressure decomposing battery 6, then suitably both electric machines 2 and 12 are made of equal capacity and have the same output as the prime mover 1. The result is thus achieved that even in the case of the total failure of the alternating current network 11, the pressure decomposer 6 will take over the entire load and that, therefore in this extreme case, the prime mover 1 can run under full load. For the purpose of distributing the load it is advised in this type or arrangement, that the field excitation 13, 14 of the two electric machines 2 and 12 be regulated as shown in the drawing. The exciting energy for both machines is supplied by an exciting machine and fed to the two field excitations 13 and 14 via the resistance 15. According to the position of the supply contact 15b with respect to the resistance 15 this exciting energy is distributed to the exciting windings 13 and 14. This adjustment of the supply contact 15b is effected by a voltage regulator 15a, known in itself, which is actuated by the varying of the voltage and the load variation corresponding therewith of the alternating current network 11. For example, if the load in the alternating current net 11 drops and with it the voltage in the same network increases, then the regulating motor 15a will vary the distribution of the exciting energy by means of the resistance 15 in such a way that the field excitation 13 of the machine 2 will be increased, the excitation 14 of the alternating current machine being correspondingly decreased. The direct current machine 2 therefore furnishes more current to the decomposer 6 and to such an extent that the prime mover 1 will be loaded to the same extent as it was before the disturbance of the equilibrium, that is to say, before the diminution in the output of the alternating current network 11.

Separate herefrom or in combination with the previously described plant, there can be connected to the alternating current net 11 an A. C.-D. C. converter 17, 18 wherein the alternating current motor 17 is connected in parallel to the net. The D. C. dynamo 18 driven thereby furnishes its current through the line 19 to the pressure decomposing battery group 20. By means of switches it is possible in case the machines 2 and 18 require it, to make 19 alternating or allow it to operate together with the pressure decomposing batteries 6 or 20.

Of these possibilities of connection, there is shown by way of example only that modification whereby the batteries 6 and 20 are connected in series and fed from the machine 2.

The load variation of the pressure decomposing group 20 and therewith that of the converters 17, 18 functions in such a manner that the total of the load of the network 11 and of the pressure decomposing group 20 remains as nearly constant as possible, so that the prime mover of the central station operates under constant load. This may be explained by way of example as follows:

The field winding 21 of the dynamo 18 (of course with the aid of a rectifier 22 to obtain direct current), is connected directly parallel to the alternating current network 11. If the load of the alternating current network drops, then its voltage rises and consequently the exciting current in the branch line 21, 22 also rises. Therefore the output of the dynamo 18 and also the load of the pressure decomposing group 20 increases. The principle of load regulation is explained by this example. If need be, necessary detail arrangements may be made by which the maximum admissible voltage variation of the main line causes a variation in load in the decomposer 20 in quite definitely desired limits.

The nature and requirements in the matter of the details used is dependent on the characteristics of the combined apparatus, 17, 18, 20 and also on the average load diagrams of the network 11.

Separately from this or in combination with the arrangements described, there can be illustrated as the simplest construction the pressure decomposing group, represented in the drawing by 20a, also connected directly parallel to the A. C. main line 11, which by means of a large rectifier 18a, converts the excess alternating current of the network 11 into direct current to be used in the pressure decomposer 20a. The load variation of the pressure decomposer group 20a is thus directly caused by the load variation and the variation in voltage is inversely proportional of the main network 11. Where the desirability of the pressure decomposer is apparent because of slight voltage variation, causes at the decomposer terminals, a relatively much greater variation in the load absorption of the pressure decomposer.

I wish it to be understood that I do not desire to be limited to the exact details of construction shown and described for obvious modifications will occur to a person skilled in the art.

I claim:—

1. Electric power station comprising a power engine, means whereby said power engine is enabled to generate both alternating and direct current, and an electrolyzer for the generation of gas under pressure connected in parallel to said direct current generating means.

2. Electric power plant, containing a prime mover, a direct current generator and an alternating current generator, both driven by this prime mover, nets connected with these two generators, and a pressure decomposing battery which is connected in parallel to the direct current net and a container for reception of the gases generated.

3. A power plant comprising an engine, a direct current and an alternating current generator connected with said engine, the capacity of each being equal to that of the engine, a pressure electrolyzer, a system to which said alternating current generator is connected, and means for regulating both generators so that the sum of the loads is at constant.

4. Electric power station comprising a power engine, a direct current generator and an alternating current generator operatively connected with said power engine, each of said generators having substantially the same output as said power engine, an electrolyzer for the generation of gas under pressure operatively connected with said direct current generator, and a system for the distribution of electric enegry electrically connected with said alternating current generator.

5. Electric power station comprising a power engine, a direct current generator and an alternating current generator operatively connected with said power engine, each of said generators having substantially the same output as said power engine, an exciting dynamo, a voltage regulator and a connection between the parallelly connected exciter coils of said generators and said dynamo across the resistance of said regulator, an electrolyzer for the generation of gas under pressure in operative connection with said direct current generator, and a system for the distribution of electric energy connected with said alternating current generator.

6. Electric power plant, containing an alternating current net, a converter group connected in parallel to this net for the purpose of converting the alternating current into direct current, means connected parallel to the alternating current net for the field excitation of the direct current generator of this converter, this means containing a rectifier, further a pressure decomposer battery fed by a direct current generator and a container for the reception of the gases generated.

In testimony whereof I affix my signature.

FRANZ LAWACZECK.